April 10, 1945.  L. GLASHOW  2,373,242
PIPE STOPPER
Filed June 30, 1944
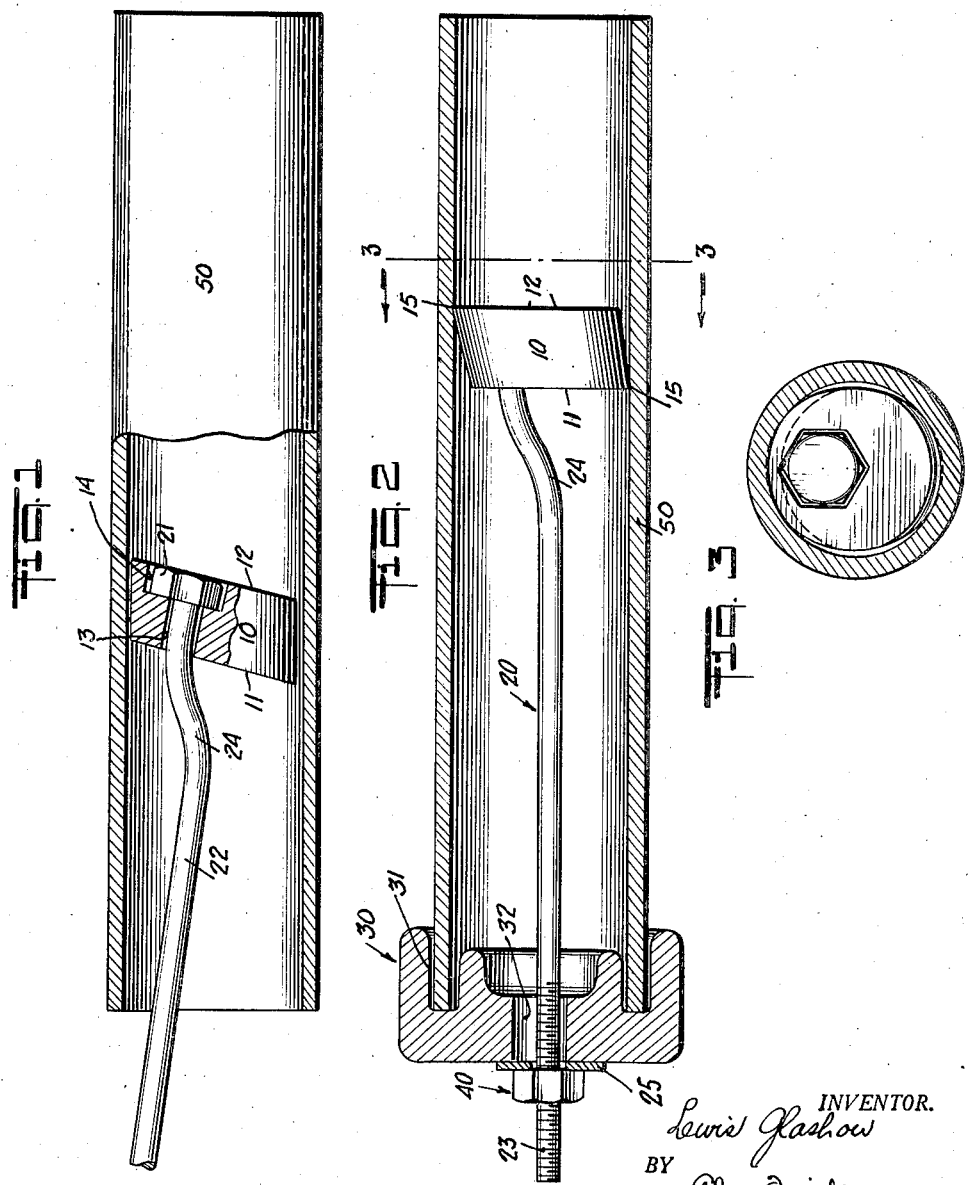
INVENTOR.
Lewis Glashow
BY
ATTORNEY Patented Apr. 10, 1945

2,373,242

UNITED STATES PATENT OFFICE 2,373,242

PIPE STOPPER

Lewis Glashow, New York, N. Y.

Application June 30, 1944, Serial No. 542,878

6 Claims. (Cl. 138—89)

The present invention relates to boiler tube stoppers.

An object of the invention is to provide a boiler tube stopper which may be installed by a single man without assistance.

Another object is to provide a boiler tube stopper which may serve as a temporary stopper, as during or pending repairs, or as a permanent stopper for the life of the boiler tube.

A further object is the provision of a positive-action, non-slip boiler tube stopper for use in high and low pressure boilers, pipes, gas mains, oil lines, drainage pipes, and pipes and tubing of whatsoever nature and description.

A still further object is the provision of a boiler tube stopper having a quick acting adjusting member.

Still another object is the provision of a boiler tube stopper having few, easily constructed parts.

These and other objects are attained by mechanism illustrated in the accompanying drawing in which Fig. 1 is a plan view of a boiler tube, partly broken away to expose the canting wedge member and part of the canting lever member of the boiler tube stopper, during insertion thereof into the boiler tube, said canting wedge member being shown partly broken away to expose that part of the canting lever member which is fixed therein;

Fig. 2 is a longitudinal section of a boiler tube showing the boiler tube stopper in locked position therein, the cap member of said boiler tube stopper being shown in section; and Fig. 3 is a transverse section on the line 3—3 of Fig. 2.

The invention herein claimed comprises a canting wedge member 10, a canting lever member 20 affixed thereto, a cap member 30 and locking means 40 mounted on said canting lever.

The canting wedge 10 comprises a unitary circular body of uniform diameter the ends 11 and 12 of which are equal parallel ellipses. Eccentric aperture 13 is formed in said circular body on an axis which is perpendicular to said ends. The aperture is enlarged at end 12 to form a polygonally shaped recess 14.

The canting lever 20 comprises an elongated bolt having the usual parts: head 21, shank 22, and screw threaded end 23. The shank has a double bend 24 formed in it adjacent the head, in such manner that that part of the shank which is above the bend and that part which is below the bend be in parallel lines. A washer 25 is mounted on the shank at its screw threaded end. It performs the usual function of washers as will hereinafter appear. It will be noted that bolt head 21 is polygonally shaped to correspond to the shape of polygonally shaped recess 14. The dimensions of head 21 are slightly smaller than those of the recess enabling the latter snugly to accommodate the former.

The cap 30 comprises a unitary, circular member having a circular groove 31 formed in the face thereof, concentric with the periphery thereof, and an aperture 32 formed in the center thereof, in axial alignment with said groove. The diameter of said aperture is substantially larger than the diameter of bolt shank 22.

The locking means 40 comprises a nut which is screwed on to threaded end 23 of canting lever 20.

When the device is assembled, the lever is fixed in the wedge member as shown in Fig. 1, the shank 22 of said lever being carried in aperture 13 of said wedge member, the head 21 of said lever being disposed in recess 14 of said wedge member. Longitudinal movement of said lever relative to said wedge is prevented by head 21 and shank bend 24 of said lever. Rotary movement of said lever relative to said wedge is prevented by the interlocking connection between the polygonally shaped wedge recess 14 and the correspondingly shaped lever head 21. It will be appreciated from this description that the lever and the wedge perform as one integral unit, movement of the one causing a corresponding, integral movement of the other.

It will be seen from Fig. 1 that the diameter of the wedge is somewhat smaller than the inside diameter of boiler tube 50 into which it is inserted. This relationship makes for easy insertion into the tube when the wedge is properly aligned therewith, in concentric relation thereto. It will also be seen that the distance between the sharp edges 15 of the wedge formed where its side and end walls meet at acute angles, is greater than the inside diameter of the tube. This relationship enables the wedge, and more specifically its sharp edges, to bite into the inside wall of the tube when the wedge is brought into canted position therein. This can be seen in Fig. 2.

To bring the wedge into canted position within the boiler tube, the lever is pivoted on an axis which extends transversely of the tube. The result of this operation can be seen in Fig. 2. It should be noted at this point that the purpose of the double bend in the shank of the lever is to enable the wedge to be introduced into the tube while the lever is in raised position, thus providing the necessary leverage for the wedging operation, and at the same time providing for substantial axial alignment of said lever with said tube, after the lever has brought the wedge into canted position.

To lock the wedge in canted or wedged position in the tube, the cap 30 is mounted on the lever as shown in Fig. 2, and the locking means or nut 40 is tightened against it, or more specifically, against the washer which is disposed between said nut and said cap. As can be seen in Fig. 2, the circular groove 31 formed in the face of the cap, receives the open end of the tube. When the nut is tightened against the cap, the effect is threefold: the tightening of the nut tends to draw the wedge into a more accentuated cant, the lever is locked into position, and the cap is locked against the open end of the tube thus closing it tightly.

The device herein described may be modified in many particulars without departing from the basic invention. Thus the lever may be made integral with the wedge, instead of merely being connected to it. The wedge itself may be made of a different design, but as long as its shape and dimensions will allow it to be introduced into the tube and will cause it to wedge into the inner wall of the tube when canted on an axis extending transversely of the tube, the basic principles of the invention are observed.

I claim:

1. A pipe stopper comprising a wedge, a lever affixed thereto and adapted to move integrally therewith, a pipe cap carried by said lever and locking means carried by said lever, bearing longitudinally against said lever, and thrusting longitudinally against said cap, said wedge being adapted for introduction into a pipe and adapted, when canted, to wedge into said pipe, said lever being adapted to cant said wedge into wedged position in said pipe when pivoted on an axis extending transversely of said pipe, said cap being adapted to close said pipe when placed in pressure contact with the open end thereof, said locking means being adapted, by a single action, to lock said lever in wedge-canting position in said pipe and to place and lock said cap in pressure contact with the open end of said pipe.

2. A pipe stopper in accordance with claim 1 wherein the wedge comprises a unitary circular body of uniform diameter whose ends describe equal, parallel ellipses.

3. A pipe stopper in accordance with claim 1 wherein the wedge comprises a unitary circular body of uniform diameter whose ends describe equal, parallel ellipses, said wedge having an eccentric aperture formed therein on an axis which is perpendicular to said ends, said aperture being adapted to receive said lever.

4. A pipe stopper in accordance with claim 1 wherein the lever comprises an elongated bolt whose shank has a double bend formed in it, the shank portion above the bend and the shank portion below the bend, being disposed on parallel axes.

5. A pipe stopper in accordance with claim 1 wherein the pipe cap comprises a unitary, circular member having a circular groove formed in the face thereof, concentric with the periphery thereof, and having an aperture formed in the center thereof, in axial alignment with said groove.

6. A pipe stopper in accordance with claim 1 wherein the lever comprises an elongated bolt whose shank has a double bend formed therein, and wherein the locking means comprises a nut screwed on to said bolt.

LEWIS GLASHOW.